(12) United States Patent
Ashida et al.

(10) Patent No.: US 12,337,897 B2
(45) Date of Patent: Jun. 24, 2025

(54) PARKING ASSIST DEVICE AND PARKING ASSIST METHOD

(71) Applicant: Panasonic Intellectual Property Management Co., Ltd., Osaka (JP)

(72) Inventors: Kohei Ashida, Tokyo To (JP); Takafumi Tokuhiro, Kanagawa Ken (JP); Shota Akaura, Kanagawa Ken (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 56 days.

(21) Appl. No.: 18/227,028

(22) Filed: Jul. 27, 2023

(65) Prior Publication Data
US 2023/0365193 A1    Nov. 16, 2023

Related U.S. Application Data

(63) Continuation of application No. PCT/JP2022/001821, filed on Jan. 19, 2022.

(30) Foreign Application Priority Data

Mar. 30, 2021  (JP) ................................ 2021-057592

(51) Int. Cl.
*B62D 15/02*    (2006.01)
*B60W 50/14*    (2020.01)

(52) U.S. Cl.
CPC ... *B62D 15/0275* (2013.01); *B60W 2050/146* (2013.01)

(58) Field of Classification Search
CPC ........ B62D 15/0275; B60W 2050/146; B60W 30/06; B60W 50/14; B60R 99/00; G08G 1/16; H04N 7/18
See application file for complete search history.

(56) References Cited

U.S. PATENT DOCUMENTS

2004/0153243 A1* 8/2004 Shimazaki ......... B62D 15/0275
                                                          701/1
2009/0251334 A1* 10/2009 Yoshihashi ........... B60W 50/14
                                                        340/932.2

(Continued)

FOREIGN PATENT DOCUMENTS

JP    2008-179253 A    8/2008
JP    2009-205191 A    9/2009

(Continued)

OTHER PUBLICATIONS

International Search Report issued in WIPO Patent Application No. PCT/JP2022/001821, dated Mar. 1, 2022, along with an English translation thereof.

*Primary Examiner* — Ryan W Sherwin
(74) *Attorney, Agent, or Firm* — GREENBLUM & BERNSTEIN, P.L.C.

(57) ABSTRACT

A parking assist device including a processor is disclosed. The processor superimposes a first parking candidate frame and a second parking candidate frame onto an image around a vehicle when a first obstacle is present at one end of a parking space and a second obstacle is present at another end of the parking space. The first parking candidate frame is parallel with a first obstacle frame indicating a position of the first obstacle. The second parking candidate frame is parallel with a second obstacle frame indicating a position of the second obstacle. The processor displays, on a display device, the first/second parking candidate frames in different display modes. The processor displays, on the display device and in a predetermined color, either one of a first region surrounded by the first parking candidate frame and a second region surrounded by the second parking candidate frame.

14 Claims, 3 Drawing Sheets

(56) References Cited

U.S. PATENT DOCUMENTS

| | | | | |
|---|---|---|---|---|
| 2010/0289634 A1* | 11/2010 | Ikeda | ............... | B60R 1/26 |
| | | | | 340/441 |
| 2011/0069169 A1* | 3/2011 | Kadowaki | ............. | B60R 1/26 |
| | | | | 348/148 |
| 2017/0253236 A1* | 9/2017 | Hayakawa | ............ | G08G 1/143 |
| 2018/0308359 A1 | 10/2018 | Hayakawa | | |
| 2019/0073902 A1* | 3/2019 | Indoh | ............ | G06V 20/58 |
| 2020/0074759 A1* | 3/2020 | Seo | ............ | G01S 17/931 |
| 2020/0090517 A1* | 3/2020 | Cetin | ............ | G08G 1/143 |
| 2020/0398825 A1* | 12/2020 | Tsujino | ............ | G06V 20/58 |
| 2021/0107468 A1* | 4/2021 | Wang | ............ | B60W 60/001 |
| 2022/0111793 A1* | 4/2022 | Iino | ............ | B60R 1/26 |

FOREIGN PATENT DOCUMENTS

| | | | |
|---|---|---|---|
| JP | 2010-089642 A | | 4/2010 |
| JP | 2016215691 A | * | 12/2016 |
| WO | 2017/068695 A1 | | 4/2017 |

* cited by examiner

PARKING ASSIST DEVICE AND PARKING ASSIST METHOD

CROSS-REFERENCE TO RELATED APPLICATIONS

This application is a continuation of International Application No. PCT/JP2022/001821, filed on Jan. 19, 2022, which claims the benefit of priority of the prior Japanese Patent Application No. 2021-057592, filed on Mar. 30, 2021, the entire contents of which are incorporated herein by reference.

FIELD

Embodiments described herein relate generally to a parking assist device and a parking assist method.

BACKGROUND

In the related art, a parking assist device has been known. The parking assist device displays, on a display device, an image of a parking space around a vehicle taken by an imaging unit, and superimposes a plurality of parking candidate frames on the displayed parking space (See, for example, Japanese Patent Application Laid-open No. 2016-215691).

SUMMARY

A parking assist device according to the present disclosure includes an imaging device, a detection device, and a hardware processor. The imaging device is configured to image a parking space around a vehicle. The detection device is configured to detect an obstacle around the parking space. The hardware processor is connected to a memory. The hardware processor is configured to superimpose a first parking candidate frame and a second parking candidate frame onto an image taken by the imaging device when a first obstacle is present at one end of the parking space and a second obstacle is present at another end of the parking space. The first parking candidate frame is parallel with a first obstacle frame indicating a position of the first obstacle. The second parking candidate frame is parallel with a second obstacle frame indicating a position of the second obstacle. The hardware processor is configured to display, on a display device, the first parking candidate frame and the second parking candidate frame in different display modes. The hardware processor is configured to display, on the display device and in a predetermined color, either one of a first region surrounded by the first parking candidate frame and a second region surrounded by the second parking candidate frame.

DETAILED DESCRIPTION

The following describes an embodiment of a parking assist device and a parking assist method according to the present disclosure in detail with reference to the drawings as appropriate. However, unnecessarily detailed description may be omitted in some cases. For example, detailed description about a well-known matter or redundant description about substantially the same configuration may be omitted in some cases. This is because the following description should be prevented from being unnecessarily redundant to enable those skilled in the art to easily understand the description.

Embodiment

Configuration of Parking Assist Device 100

Figure 1:
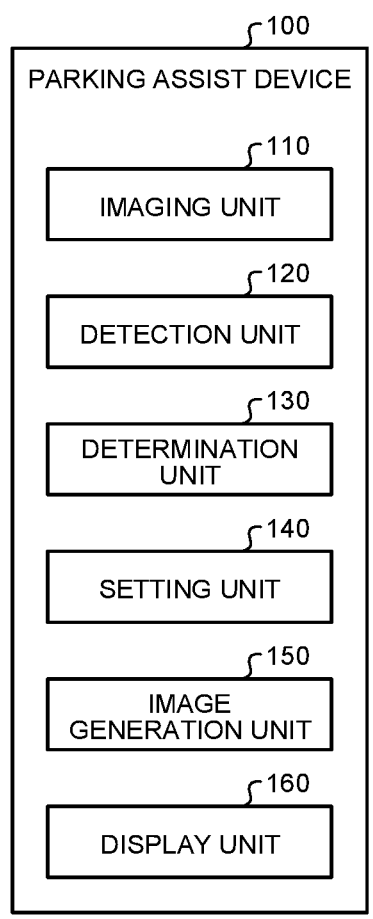
FIG. 1 is a block diagram illustrating an example of a configuration of a parking assist device according to an embodiment.

FIG. 1 is a block diagram illustrating an example of a configuration of a parking assist device 100. The parking assist device 100 includes an imaging unit 110 (an example of the imaging device), a detection unit 120 (an example of the detection device), a determination unit 130, a setting unit 140, an image generation unit 150 (an example of the hardware processor), and a display unit 160 (an example of the display device).

Figure 3:
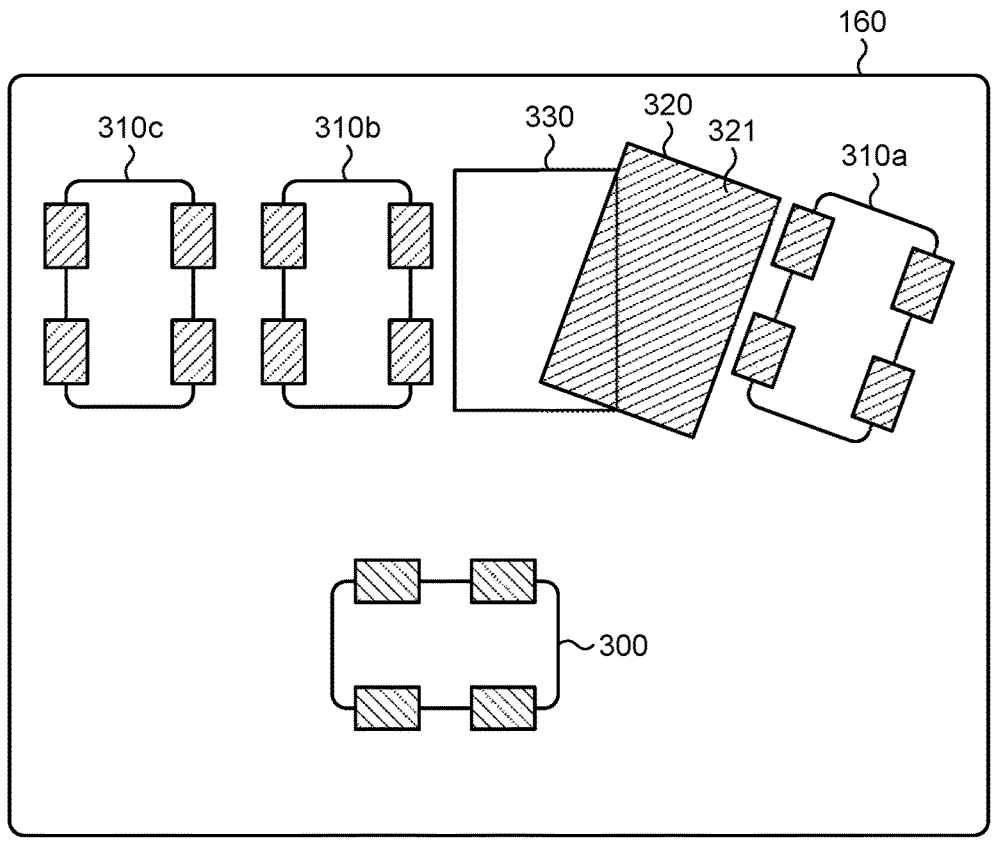
FIG. 3 is a schematic diagram illustrating a display example displayed by the parking assist device according to the present embodiment.

The imaging unit 110 includes onboard cameras that can take an image of a parking space. The onboard cameras are installed in a vehicle 300 (FIG. 3). The onboard cameras include a first onboard camera that images a front side of the vehicle 300, a second onboard camera that images a rear side of the vehicle 300, a third onboard camera that images a left side of the vehicle 300, and a fourth onboard camera that images a right side of the vehicle 300. Hereinafter, in a case of not distinguishing the first onboard camera, the second onboard camera, the third onboard camera, and the fourth onboard camera from each other, they are simply referred to as the onboard cameras. The imaging unit 110 outputs a taken image to the image generation unit 150. The imaging unit 110 is not limited to a visible light camera. The imaging unit 110 may be, for example, a Charge-Coupled Device (CCD) camera or a Complementary MOS (CMOS) camera. The image to be taken may be a static image or a moving image.

The detection unit 120 detects an obstacle and a parking space. In one example, the detection unit 120 includes a range sensor. In one example, the range sensor is ultrasonic sonar. For example, in a case where the vehicle 300 is traveling around the parking space, the ultrasonic sonar emits ultrasonic waves, detects an obstacle present around the vehicle 300 on the basis of reflected waves that are reflected and detected, and detects a distance to the obstacle. The ultrasonic sonar then calculates contour points of the obstacle on the basis of the distance to the obstacle, and acquires information representing the parking space on the basis of the contour points. The obstacle may be parked vehicles 310a, 310b, or 310c that are parked adjacent to the parking space, or may be a utility pole, a wall, a traffic sign, and so forth. The range sensor is not limited to the ultrasonic sonar, but may be a millimeter wave radar, or Light Detection and Ranging, Laser Imaging Detection and Ranging (LiDAR), etc.

The imaging unit 110 may be configured to also serve as the detection unit 120. In such a case, the imaging unit 110 processes a taken image signal and detects the obstacle and the parking space. As a method of detecting the parking space from the image signal, a known method such as pattern matching may be used. The parking assist device 100 may also include a processing unit (not illustrated) to detect the obstacle and the parking space. In such a case, the processing unit receives the image signal from the imaging unit 110 and processes the received image signal to detect the obstacle and the parking space.

The determination unit 130 determines whether there is a space where the vehicle 300 can be parked in the parking space detected by the detection unit 120. In one example, the determination unit 130 previously stores information about a size of the vehicle 300 (including a vehicle width, a vehicle height, a vehicle length, and so forth) and compares the size of the vehicle 300 with a size of the parking space. Then the determination unit 130 determines whether the size of the vehicle 300 is equal to or smaller than the size of the parking space. In a case where the size of the vehicle 300 is equal to or smaller than the size of the parking space, the determination unit 130 makes determination that the vehicle 300 can be parked in the parking space.

The setting unit 140 sets a virtual frame line for an obstacle (hereinafter, referred to as an obstacle frame). In one example, in a case where there are obstacles at ends of the parking space, a first obstacle frame is set for a first obstacle present at one end of the parking space, and a second obstacle frame is set for a second obstacle present at another end of the parking space. The obstacle frame does not necessarily have a rectangular shape. As long as the obstacle is entirely surrounded, the obstacle frame may have a shape other than the rectangular shape, such as a polygonal shape.

The image generation unit 150 generates an image to be displayed on the display unit 160. The image generation unit 150 combines infinite points of a left side image, a right side image, a rear image, and a front image, which are taken by the imaging unit 110, to be one infinite point. The image generation unit 150 then performs viewpoint conversion on the four images as if they are viewed from one virtual viewpoint. After that, the image generation unit 150 composites the four images to generate one composite image. The image generation unit 150 outputs the generated composite image to the display unit 160. The image generation unit 150 may output a taken image taken by a single onboard camera to the display unit 160, instead of the composite image.

The image generation unit 150 superimposes a parking candidate frame onto the composite image or a taken image taken by a single onboard camera. In one example, in a case where there are obstacles at the ends of the parking space, a first parking candidate frame 320 (refer to FIG. 3) is generated so as to become parallel with the first obstacle frame, and a second parking candidate frame 330 (refer to FIG. 3) is generated so as to become parallel with the second obstacle frame. The image generation unit 150 superimposes the generated first parking candidate frame 320 and second parking candidate frame 330 onto the composite image or the taken image. In other words, in a case where the first obstacle is present at one end of the parking space and the second obstacle is present at another end of the parking space, the first parking candidate frame 320 parallel with the first obstacle frame indicating a position of the first obstacle and the second parking candidate frame 330 parallel with the second obstacle frame indicating a position of the second obstacle are superimposed onto the composite image or the taken image. The parking candidate frame indicates a position at which the vehicle 300 is completely parked at the time when parking assist is performed on the vehicle 300 to park in the parking space. The user determines any one of the parking candidate frames, and thereby parking assist is performed on the vehicle 300 to park at a position indicated by the determined parking candidate frame.

The parking candidate frame is superimposed onto the parking space in the image while being offset along the corresponding obstacle frame. For example, the first parking candidate frame 320 is superimposed while being offset between a center of the parking space and the first obstacle frame. The second parking candidate frame 330 is superimposed between the center of the parking space and the second obstacle frame.

Moreover, the image generation unit 150 displays the first parking candidate frame 320 and the second parking candidate frame 330 in different display modes. Specifically, the image generation unit 150 generates a superimposed image in which the display modes are different from each other, on the basis of various kinds of data (for example, luminance information and position information of the first parking candidate frame 320 and the second parking candidate frame 330). In one example, the image generation unit 150 superimposes a first region 321 surrounded by the first parking candidate frame 320 in a predetermined color. The predetermined color may be an optional color such as red, blue, or yellow. The image generation unit 150 may cause brightness or luminance of the first region 321 or the first parking candidate frame 320 to be higher than brightness or luminance of the second parking candidate frame 330 or a second region surrounded by the second parking candidate frame 330. The image generation unit 150 may generate the first region 321 and the second region to be displayed in different colors, or generate the first parking candidate frame 320 and the second parking candidate frame 330 to be displayed in different colors.

The image generation unit 150 may cause brightness or luminance of the frame line of the first region 321 or the first parking candidate frame 320 to be higher as an overlap rate between the first parking candidate frame 320 and the second parking candidate frame 330 in the parking space becomes larger.

In one example, the first parking candidate frame 320 may be set to be a parking candidate frame recommended by the parking assist device 100. Specifically, for example, a parking candidate frame around which a smaller number of obstacles are present may be set as the recommended parking candidate frame from among the parking candidate frames, on the basis of a detection result of the detection unit 120. The first parking candidate frame 320 is not necessarily set to be the parking candidate frame recommended by the parking assist device 100. The first parking candidate frame 320 may be a parking candidate frame being selected by the user at the time when the parking candidate frames are displayed on the display unit 160. In this case, the parking candidate frame that is being selected by the user becomes the first parking candidate frame 320, and the selected first parking candidate frame 320 is displayed with highlighting.

The display unit 160 displays or projects the image on which the parking candidate frames are superimposed on the basis of an output from the image generation unit 150. In one example, the display unit 160 is a display device.

Figure 2:
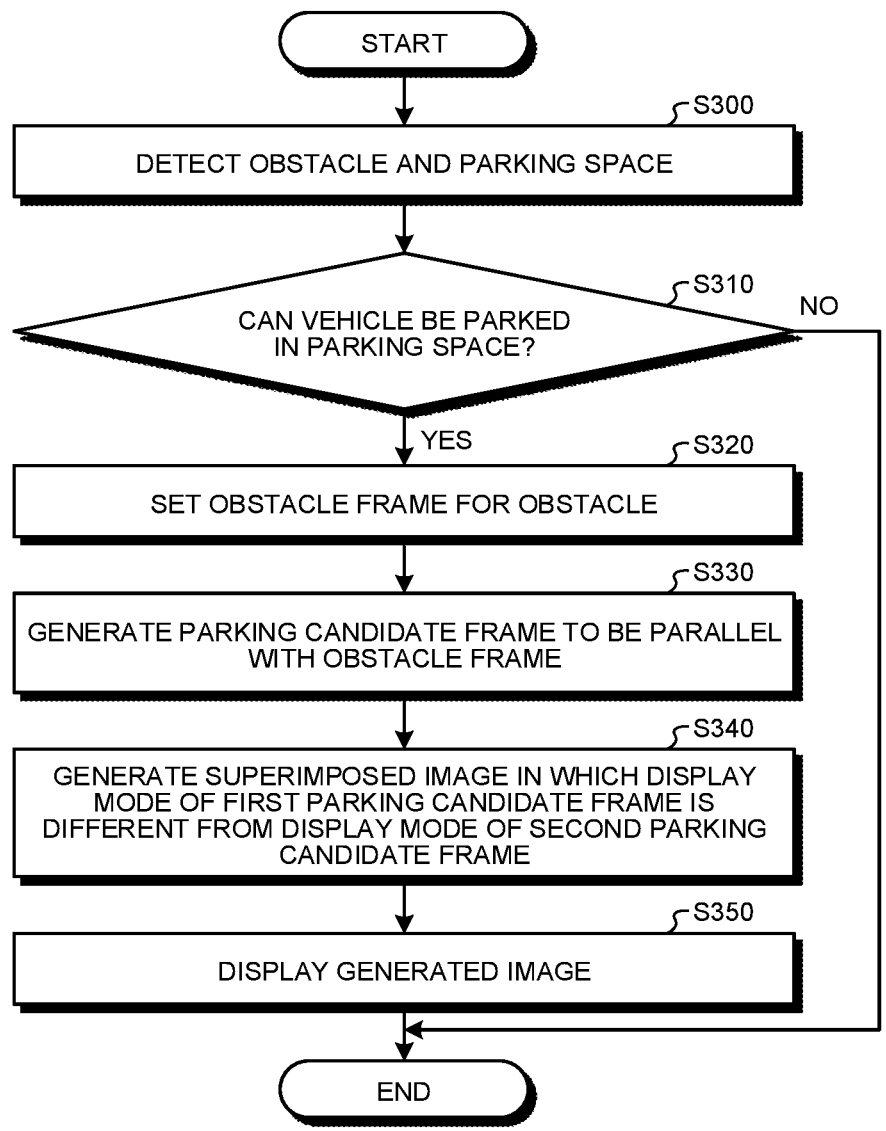
FIG. 2 is a flowchart illustrating an example of parking assist performed by the parking assist device according to the present embodiment.

Next, the following describes a procedure of parking assist processing performed by the parking assist device 100 according to the present embodiment configured as described above. FIG. 2 is a flowchart illustrating an example of parking assist performed by the parking assist device 100 according to the present embodiment. FIG. 3 is a schematic diagram illustrating a display example displayed by the parking assist device 100 according to the present embodiment.

First, the detection unit 120 detects obstacles and parking spaces (S300). In one example, the detection unit 120 detects spaces between the parked vehicles 310a, 310b, and 310c by using ultrasonic sonar.

The determination unit 130 determines whether the vehicle 300 can be parked in the parking space detected by the detection unit 120 (S310). In one example, the determination unit 130 compares the size of the parking space with the size of the vehicle 300, and determines whether the size of the vehicle 300 is equal to or smaller than the size of the parking space. More specifically, the determination unit 130 determines whether the parking space between the parked vehicle 310a and the parked vehicle 310b or the parking space between the parked vehicle 310b and the parked vehicle 310c is equal to or smaller than the size of the vehicle 300. When the size of the vehicle 300 is equal to or smaller than the size of the parking space, the determination unit 130 makes determination that the vehicle 300 can be parked therein.

If a space where the vehicle 300 can be parked is not present in the parking space (No at S310), the determination unit 130 makes determination that the vehicle 300 cannot be parked in the parking space and abandons automatic parking. When the space where the vehicle 300 can be parked is present in the parking space (Yes at S310), the setting unit 140 sets the obstacle frame for each obstacle (S320). In one example, in a case where obstacles are present at the ends of the parking space, the setting unit 140 sets the first obstacle frame for the first obstacle present at one end of the parking space, and sets the second obstacle frame for the second obstacle present at another end of the parking space. In one example, the setting unit 140 sets the first obstacle frame for the parked vehicle 310a, and sets the second obstacle frame for the parked vehicle 310b.

Subsequently, the image generation unit 150 generates the parking candidate frame that is parallel with the obstacle frame (S330). Specifically, in a case where a plurality of the obstacles are present at the ends of the parking space, the image generation unit 150 generates the first parking candidate frame 320 so as to become parallel with the first obstacle frame, and generates the second parking candidate frame 330 so as to become parallel with the second obstacle frame. In one example, the image generation unit 150 generates the first parking candidate frame 320 parallel with the parked vehicle 310a for which the first obstacle frame is set. The image generation unit 150 also generates the second parking candidate frame 330 parallel with the parked vehicle 310b for which the second obstacle frame is set.

Moreover, the image generation unit 150 generates a superimposed image in which the display mode of the first parking candidate frame 320 is different from the display mode of the second parking candidate frame 330 (S340). Specifically, the image generation unit 150 superimposes a predetermined color onto the first region 321 surrounded by the first parking candidate frame 320.

The image generation unit 150 displays, on the display unit 160, the image generated by the image generation unit 150 (S350). Specifically, as illustrated in FIG. 3, the first region 321 surrounded by the first parking candidate frame 320 is displayed in a predetermined color, and the second parking candidate frame 330 is simply displayed by a frame line.

Technical Advantages

The parking assist device 100 according to the present embodiment is able to bring technical advantages as described below.

The parking assist device 100 according to the present embodiment includes the imaging unit 110, the detection unit 120, and the image generation unit 150. The imaging unit 110 images a parking space around the vehicle. The detection unit 120 detects obstacles around the parking space. In a case where the first obstacle is present at one end of the parking space and the second obstacle is present at another end of the parking space, the image generation unit 150 superimposes, onto an image taken by the imaging unit 110, the first parking candidate frame 320 parallel with the first obstacle frame indicating the position of the first obstacle and the second parking candidate frame 330 parallel with the second obstacle frame indicating the position of the second obstacle. The image generation unit 150 displays, on the display unit 160, the first parking candidate frame 320 and the second parking candidate frame 330 in different display modes. The image generation unit 150 displays, on the display unit 160, either one of the first region 321 surrounded by the first parking candidate frame 320 and the second region surrounded by the second parking candidate frame 330 in a predetermined color. With this configuration, the parking candidate frames are superimposed and displayed on the parking space on the image. Therefore, the user is enabled to easily recognize the parking candidate frames.

The first parking candidate frame 320 is a parking candidate frame around which a smaller number of obstacles are present than the second parking candidate frame 330, or is a parking candidate frame being selected by the user from among the displayed parking candidate frames. With this configuration, the parking candidate frame having higher priority is displayed with highlighting, and thereby the user is enabled to easily recognize the parking candidate frame having higher priority.

The image generation unit 150 causes the color of the frame line of the first parking candidate frame 320 to be different from the frame line of the second parking candidate frame 330 to be displayed. Due to this, the parking candidate frames are superimposed and displayed on the parking space on the image, so that the user is enabled to easily recognize the parking candidate frames.

The image generation unit 150 causes brightness or luminance of the first parking candidate frame 320 or the region surrounded by the first parking candidate frame 320 to be higher as an overlap rate between the first parking candidate frame 320 and the second parking candidate frame 330 becomes large. Due to this, the brightness or luminance of the first parking candidate frame 320 can be differentiated from that of the second parking candidate frame 330 on the display unit 160 in accordance with the overlap rate between the first parking candidate frame 320 and the second parking candidate frame 330. Accordingly, the parking candidate frames are superimposed and displayed on the parking space onto the image, so that the user is enabled to easily recognize the parking candidate frames.

Modification

The image generation unit 150 may display a predetermined mark in the first region 321. In one example, the image generation unit 150 generates an image in which a mark of "P" indicating a parking candidate is superimposed onto the first region 321. Due to this, the user is enabled to easily recognize the recommended parking candidate frame or the parking candidate frame being selected by the user.

The image generation unit 150 may display the first parking candidate frame 320 whose thickness of the frame line is different from a thickness of the frame line of the second parking candidate frame 330. In one example, the image generation unit 150 generates an image in which the frame line of the first parking candidate frame 320 is thicker than that of the second parking candidate frame 330. Due to this, the user is enabled to relatively easily recognize the first parking candidate frame 320 or the first region 321.

The image generation unit 150 may display the first parking candidate frame 320 with blinking. In one example, the image generation unit 150 causes the first parking candidate frame 320 or the first region 321 to be displayed with blinking by alternately outputting two images that are different in luminance. Due to this, the user is enabled to easily recognize the recommended parking candidate frame or the parking candidate frame being selected by the user.

The image generation unit 150 may display the first parking candidate frame 320 in a three-dimensional manner. In one example, the image generation unit 150 generates an image in which the first parking candidate frame 320 is three-dimensionally processed. Due to this, the user is enabled to easily recognize the recommended parking candidate frame or the parking candidate frame being selected by the user.

The image generation unit 150 may display the second parking candidate frame 330 or the second region in a translucent manner. In one example, the image generation unit 150 generates an image in which transmittance of the second parking candidate frame 330 or the second region is increased. Due to this, the second parking candidate frame 330 or the second region is hardly recognized, so that the user is enabled to relatively easily recognize the first parking candidate frame 320 or the first region 321.

In the parking assist device 100 described in the present embodiment, each block such as the detection unit 120, the determination unit 130, the setting unit 140, and the image generation unit 150 may be individually made into one chip by a semiconductor device such as Large-Scale Integration (LSI), or may be made into one chip including part or all blocks.

The present disclosure encompasses a processing method performed by the parking assist device 100, a computer program that instructs a computer to perform the same processing method, and a computer-readable recording medium in which the computer program is recorded. Herein, as the computer-readable recording medium, for example, a flexible disk, a hard disk, a Compact Disc (CD)-ROM, a Magneto-Optical disk (MO), a Digital Versatile Disc (DVD), a DVD-ROM, a DVD-RAM, a Blu-ray (registered trademark) Disc (BD), and a semiconductor memory can be exemplified.

Part of or all pieces of processing performed by functional blocks according to the present embodiment may be implemented by the computer program. The pieces of processing in the present embodiment may be implemented by hardware, or may be implemented by software (including a case of being implemented with an operating system (OS), middleware, or a predetermined library). Moreover, they may be implemented by mixed processing with software and hardware.

Figure 4:
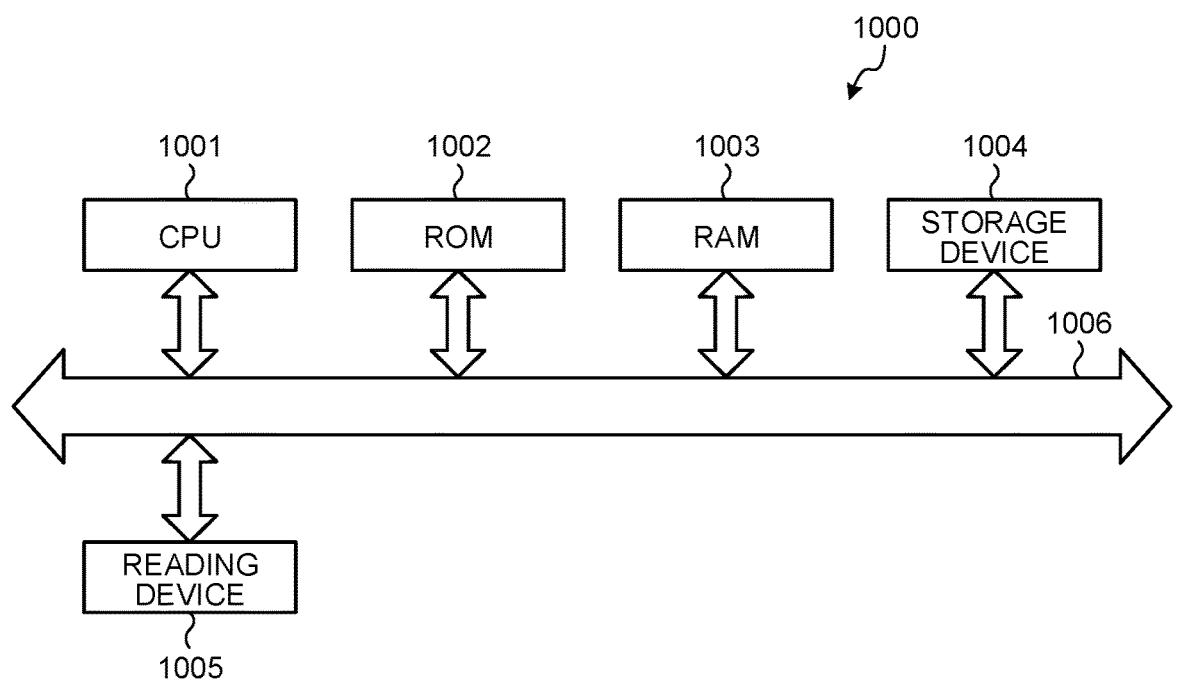
FIG. 4 is a diagram illustrating an example of a hardware configuration of a computer included in the parking assist device according to the present embodiment.

FIG. 4 is a diagram illustrating an example of a hardware configuration of a computer 1000 included in the parking assist device 100 according to the present embodiment. The computer 1000 includes a central processing unit (CPU) 1001, a read only memory (ROM) 1002, a random access memory (RAM) 1003, a storage device 1004 such as a hard disk device and a solid state drive (SSD), and a reading device 1005 that reads information from a recording medium. The respective parts described above are connected via a bus 1006. The reading device 1005 reads a computer program from a recording medium in which the computer program for implementing functions of the parts described above is recorded, and causes the storage device 1004 to store the computer program. The CPU 1001 copies the computer program stored in the storage device 1004 to the RAM 1003, and successively reads out commands included in the computer program from the RAM 1003 to be executed. Due to this, the functions of the respective parts described above are implemented. At the time of executing the computer program, pieces of information obtained through the various kinds of processing described in the embodiment are stored in the RAM 1003 or the storage device 1004 to be appropriately used.

The computer program is not necessarily recorded in the recording medium as described above, but may be transmitted via a network and the like represented by an electric communication line, a wireless or wired communication line, and the Internet. Execution order of the processing method according to the present embodiment is not necessarily limited to the description of the embodiment described above. The execution order can be changed without departing from the gist of the present disclosure.

While certain embodiments have been described, these embodiments have been presented by way of example only, and are not intended to limit the scope of the inventions. Indeed, the novel methods and systems described herein may be embodied in a variety of other forms; moreover, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:
1. A parking assist device comprising:
a hardware processor; and
a memory having instructions which, when executed by the hardware processor, cause the hardware processor to perform operations comprising:
   imaging, by an imaging device, a parking space around a vehicle;
   detecting an obstacle around the parking space;
   superimposing a first parking candidate frame and a second parking candidate frame onto an image taken by the imaging device when a first obstacle is present at one end of the parking space and a second obstacle is present at another end of the parking space, the first parking candidate frame being parallel with a first obstacle frame indicating a position of the first obstacle, the second parking candidate frame being parallel with a second obstacle frame indicating a position of the second obstacle;
   displaying, on a display device, the first parking candidate frame and the second parking candidate frame in different display modes;
   displaying, on the display device and in a predetermined color, either one of a first region surrounded by the first parking candidate frame and a second region surrounded by the second parking candidate frame; and displaying, on the display device, the first parking candidate frame or a region surrounded by the first parking candidate frame whose brightness or luminance becomes higher as an overlap rate between the first parking candidate frame and the second parking candidate frame becomes larger, wherein the first parking candidate frame is either one of:

a parking candidate frame around which a smaller number of obstacles are present than the second parking candidate frame, and a parking candidate frame being selected by a user from among parking candidate frames displayed on the display device.

2. The parking assist device according to claim 1, wherein the instructions which, when executed by the hardware processor, further cause the hardware processor to perform operations comprising displaying, on the display device, a predetermined mark in the first region.

3. The parking assist device according to claim 1, wherein the instructions which, when executed by the hardware processor, further cause the hardware processor to perform operations comprising displaying, on the display device, the first parking candidate frame whose color of a frame line is different from a color of a frame line of the second parking candidate frame.

4. The parking assist device according to claim 1, wherein the instructions which, when executed by the hardware processor, further cause the hardware processor to perform operations comprising displaying, on the display device, the first parking candidate frame whose thickness of a frame line is different from a thickness of a frame line of the second parking candidate frame.

5. The parking assist device according to claim 1, wherein the instructions which, when executed by the hardware processor, further cause the hardware processor to perform operations comprising displaying, on the display device, the first parking candidate frame with blinking.

6. The parking assist device according to claim 1, wherein the instructions which, when executed by the hardware processor, further cause the hardware processor to perform operations comprising displaying, on the display device, the first parking candidate frame in a three-dimensional manner.

7. The parking assist device according to claim 1, wherein the instructions which, when executed by the hardware processor, further cause the hardware processor to perform operations comprising displaying, on the display device, the second parking candidate frame in a translucent manner.

8. A parking assist method comprising:

imaging a parking space around a vehicle;

detecting an obstacle around the parking space;

superimposing a first parking candidate frame and a second parking candidate frame onto an image taken by the imaging device when a first obstacle is present at one end of the parking space and a second obstacle is present at another end of the parking space, the first parking candidate frame being parallel with a first obstacle frame indicating a position of the first obstacle, the second parking candidate frame being parallel with a second obstacle frame indicating a position of the second obstacle;

displaying, on a display device, the first parking candidate frame and the second parking candidate frame in different display modes;

displaying, on the display device and in a predetermined color, either one of a first region surrounded by the first parking candidate frame and a second region surrounded by the second parking candidate frame; and displaying, on the display device, the first parking candidate frame or a region surrounded by the first parking candidate frame whose brightness or luminance becomes higher as an overlap rate between the first parking candidate frame and the second parking candidate frame becomes larger, wherein the first parking candidate frame is either one of:

a parking candidate frame around which a smaller number of obstacles are present than the second parking candidate frame, and a parking candidate frame being selected by a user from among parking candidate frames displayed on the display device.

9. The parking assist method according to claim 8, further comprising displaying, on the display device, a predetermined mark in the first region.

10. The parking assist method according to claim 8, further comprising displaying, on the display device, the first parking candidate frame whose color of a frame line is different from a color of a frame line of the second parking candidate frame.

11. The parking assist method according to claim 8, further comprising displaying, on the display device, the first parking candidate frame whose thickness of a frame line is different from a thickness of a frame line of the second parking candidate frame.

12. The parking assist method according to claim 8, further comprising displaying, on the display device, the first parking candidate frame with blinking.

13. The parking assist method according to claim 8, further comprising displaying, on the display device, the first parking candidate frame in a three-dimensional manner.

14. The parking assist method according to claim 8, further comprising displaying, on the display device, the second parking candidate frame in a translucent manner.

* * * * *